(12) United States Patent
Squires et al.

(10) Patent No.: US 9,760,505 B2
(45) Date of Patent: Sep. 12, 2017

(54) NETWORK INTERFACE CONTROLLER EMULATION

(71) Applicant: HGST Netherlands B.V., Amsterdam (NL)

(72) Inventors: Christopher Squires, Boulder, CO (US); Curtis Bruner, Niwot, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 298 days.

(21) Appl. No.: 14/096,606

(22) Filed: Dec. 4, 2013

(65) Prior Publication Data

US 2015/0154127 A1 Jun. 4, 2015

(51) Int. Cl.
*G06F 9/455* (2006.01)
*G06F 13/10* (2006.01)
*H04L 29/08* (2006.01)

(52) U.S. Cl.
CPC ............ *G06F 13/105* (2013.01); *G06F 9/455* (2013.01); *H04L 67/1097* (2013.01)

(58) Field of Classification Search
CPC ...... G06F 3/0664; G06F 13/105; G06F 9/455; H05C 67/1097
USPC .............................. 703/25; 709/223
See application file for complete search history.

(56) References Cited

U.S. PATENT DOCUMENTS

2007/0189308 A1* 8/2007 Tchigevsky et al. ......... 370/396
2010/0292982 A1* 11/2010 Dube et al. ..................... 703/24

* cited by examiner

*Primary Examiner* — Dwin M Craig (57) ABSTRACT

Examples disclosed herein provide systems, methods, and software for network interface controller emulation. In one example, a method of operating a storage subsystem coupled with a host includes emulating, to a main processing system on the host, a network connection through an emulated network interface controller (NIC) to a storage volume. The method further includes receiving, over a bus between the main processing system and the storage subsystem, a data request originated by the main processing system and directed to the emulated NIC that requests access to the storage volume. The method also includes providing the main processing system with the access to the storage volume via the emulated NIC as if the storage volume were accessible over the network connection.

20 Claims, 6 Drawing Sheets

NETWORK INTERFACE CONTROLLER EMULATION

TECHNICAL BACKGROUND

Servers and network attached storage (NAS) are connected to client devices using Ethernet or some other similar protocol. This standard protocol allows for communication between multiple clients as well as multiple serving devices. Typically, when data is to be stored on one of the serving devices from one of the client devices, the data is passed, using a data bus, from the client processing unit to a network interface controller (NIC) on the client device. From the NIC, the data is passed using Ethernet or some other similar protocol to the server or NAS. Upon arrival at the server or NAS, the transmission must then be reverted back to PCIe or some other data bus before it can be passed on to the appropriate drive by a processing unit on the serving device.

Most servers or NAS include at least one NIC, a computer processing system, and one or more drives or storage volumes to store the information from the client devices. The NIC is responsible for taking in the information from the client devices and, in reverse, supplying the data to the client devices. Connected to the NIC, the computer processing system is configured to control the storing and retrieving of data from the one or more drives, which may include solid state storage elements, hard disk elements, virtual hard drives among other storage solutions.

Overview

Examples disclosed herein provide systems, methods, and software for network interface controller emulation. In one example, a method of operating a storage subsystem coupled with a host includes emulating, to a main processing system on the host, a network connection through an emulated network interface controller (NIC) to a storage volume. The method further includes receiving, over a bus between the main processing system and the storage subsystem, a data request originated by the main processing system and directed to the emulated NIC that requests access to the storage volume. The method also includes providing the main processing system with the access to the storage volume via the emulated NIC as if the storage volume were accessible over the network connection.

In another example, a computer apparatus to operate a storage subsystem coupled with a host includes processing instructions that direct the storage subsystem to emulate, to a main processing system on the host, a network connection through an emulated network interface controller (NIC) to a storage volume. The processing instructions further direct the storage subsystem to receive, over a bus between the main processing system and the storage subsystem, a data request originated by the main processing system and directed to the emulated NIC that requests access to the storage volume. The program instructions also direct the storage subsystem to provide the main processing system with the access to the storage volume via the emulated NIC as if the storage volume were accessible over the network connection. The apparatus further includes one or more non-transitory computer readable media that store the processing instructions.

In another instance, a storage subsystem includes an emulated network interface controller (NIC) configured to emulate a network connection between a main processing system and a storage volume. The emulated NIC is also configured to receive, over a bus between the host and the storage subsystem, a data request originated by the main processing system and directed to the emulated NIC that requests access to the storage volume. The emulated NIC is further configured to provide the main processing system with the access to the storage volume as if the storage volume were accessible over the network connection.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Computing systems, such as laptops, desktops, and the like, typically communicate with external storage devices, such as servers or network attached storage elements, using network interface controllers. These controllers allow the computing systems to gather or send data from one or more storage volumes that are located on the networked storage elements. As a result, rather than processing all of the storage needs of the computing system locally, the computing system can instead rely on the serving device to handle some of the read and write storage responsibilities.

In some situations, it may be beneficial for a computing system to delegate certain storage responsibilities, but to maintain the speed that a local storage volume provides. Thus, instead of communicating with a network storage element to read or write data using a network interface controller, a computing system may prefer to emulate a connection between a network interface controller and a network storage element. Thus, by providing an emulated network interface controller, the main processing system for the computing device may interact with the volumes as if they were on a network attached storage element. This may allow the main processing system to delegate some of the read and write processing, but maintaining the speed of locally provided drives.

Figure 1:
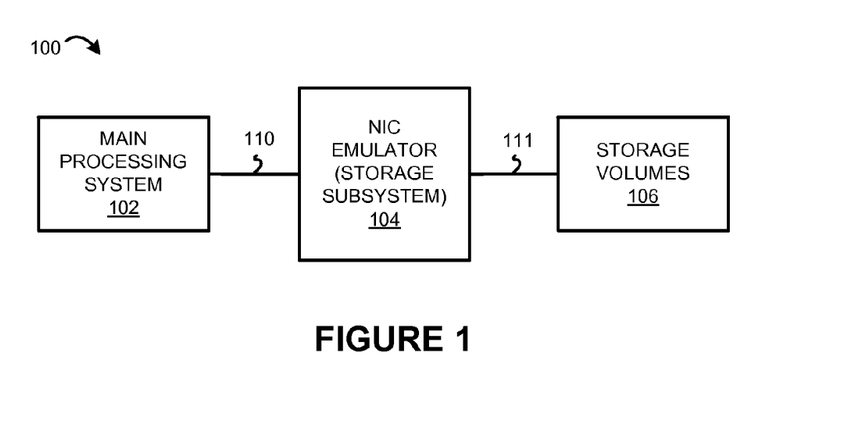
FIG. 1 a network interface controller emulation system.

Turning now to FIG. 1, FIG. 1 illustrates a network interface controller (NIC) emulation system 100. NIC emulation system 100 includes main processing system 102, NIC emulator 104, which may be part of a storage subsystem, and storage volumes 106. Main processing system 102 is communicatively coupled to NIC emulator 104 over communication link 110. NIC emulator 104 is further communicatively coupled to storage volumes 106.

Main processing system 102 may reside on a computing device such as a desktop computer, server computer, or some other similar computing device. Storage volumes 106 represent volumes of data that may need to be accessed by main processing system 102. In operation, main processing system 102 may have a data request for storage volumes 106. A data request may include a read request for data on storage volumes 106, a write request for data on storage volumes 106, or any other type of data request for storage volumes 106. To satisfy the request of main processing system 102, NIC emulator 104 is used to make storage volumes 106 appear as though they are on a NAS or another external serving device. To accomplish this task, NIC emulator 104 will imitate a NIC to NIC connection that might be found between a client device and a network attached storage (NAS) element or a server. Thus, main processing system 102 may communicate with NIC emulator 104 as though NIC emulator 104 is an actual NIC communicating with an external device. However, the storage volumes, such as storage volumes 106, may be present on the same computing device as main processing system 102 and simply appear as though they are external to processing system 102.

Figure 2:
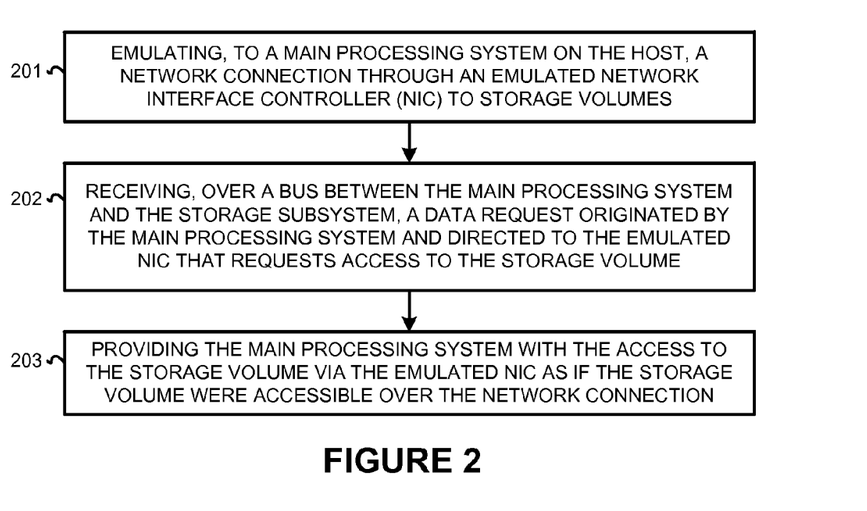
FIG. 2 illustrates a method of network interface controller emulation.

To better illustrate the operation of NIC emulator 104 and NIC emulation system 100, FIG. 2 provides a method for operating a storage subsystem coupled with a host. The method includes emulating, to main processing system 102 on the host, a network connection through NIC emulator 104 to storage volumes 106 (201). This emulation allows storage volumes 106 to appear as though they are on a NAS or other external serving device, when in reality the storage volumes may reside on the same device as main processing system 102.

The method further includes, receiving, over a bus between main processing system 102 and the storage subsystem, a data request originated by main processing system 102 and directed to NIC emulator 104 that requests access to storage volumes 106 (202). This data request may include a request to read data from storage volumes 106, a request to write data in storage volumes 106, or any other storage request for storage volumes 106. In some examples, NIC emulator 104 will receive the request over a Peripheral Component Interconnect Express (PCIe) bus, a Peripheral Component Interconnect (PCI) bus, or some other similar bus.

After receiving the data request, the method further includes providing main processing system 102 with the access to storage volumes 106 via NIC emulator 104 as if the storage volumes were accessible over the network connection (203). Typically, a NIC to NIC connection is a connection that is found between a client or host device and a serving system, such as a server or a NAS. A usual NIC to NIC communication may communicate over Ethernet, or any other similar communication protocol. In operation, a typical NIC to NIC communication includes a processing system on a host device that communicates with a local NIC over a PCIe, PCI, or other similar data bus system. From the NIC, the communication is further connected to the serving device using Ethernet or some other similar protocol. Finally, the serving device processes the communication from the client device after the communication is received at the serving device NIC.

In the present example, NIC emulator 104 is used to truncate and impersonate the typical connection between a client device and a server. Thus, instead of the client device communicating with a NIC to receive or send information to the requested storage volumes, NIC emulator 104, which may reside on the same device as main processing system 102, will make storage volumes 106 appear as though they are on a serving device.

Returning to FIG. 1, main processing system 102 may be any processing system capable of sending, requesting, and receiving data using a network interface controller. Main processing system 102 may reside on a server computer, a desktop computer, a laptop computer, or any other similar computing system. Processing system 102 may comprise one or more microprocessors and other circuitry that execute applications and make data requests to storage volumes 106. Processing system 102 can be implemented within a single processing device, but can also be distributed across multiple processing devices or sub-systems that cooperate in execution. Examples of processing system 102 include general-purpose central processing units, application specific processors, system-on-a-chip devices, and logic devices, as well as any other type of processing device, combinations, or variations thereof. In some examples, main processing system 102 may reside on a computing system that contains a variety of software, user interface elements, and communication elements.

NIC emulator 104 may include software, hardware, firmware and other elements to mimic a NIC for main processing system 102. NIC emulator 104 may reside in a storage subsystem on the same computing device as processing system 102 or may be external to the computing device. Storage volumes 106 may comprise any storage media or storage device capable for use with main processing system 102. Storage volumes 106 may include volatile and non-volatile, removable and non-removable media implemented in any method or technology for storage of information. Storage volumes 106 may reside on a separate device that is communicatively coupled to NIC emulator 104, or may reside on the same device as NIC emulator 104.

Communication link 110 may be a wired communication link configured to communicate using PCIe, PCI, or some other form of computer communication bus. Communication link 110 provides data communications between NIC emulator 104 and main processing system 102. Communication link 111 may include a wired or optical communication link between NIC emulator 104 and storage volumes 106. In some examples, storage volumes 106 may be directly coupled to NIC emulator 104, such that NIC emulator determines the appropriate storage volume for a data request and directly communicates with that volume.

Figure 3:
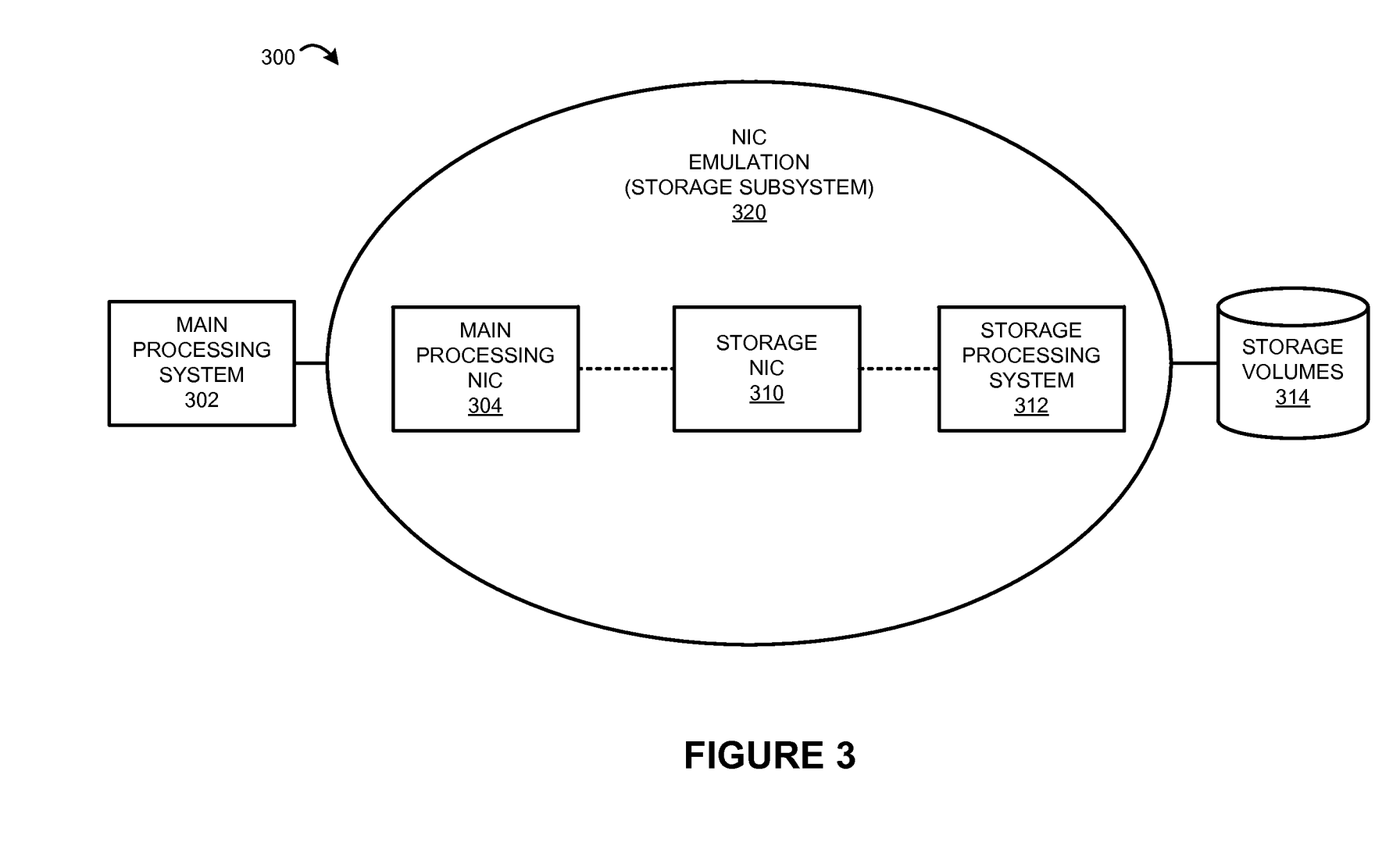
FIG. 3 illustrates an overview of network interface controller emulation.

Referring now to FIG. 3, FIG. 3 illustrates an overview 300 of network interface controller emulation according to at least one example. Overview 300 includes main processing system 302, main processing network interface controller (NIC) 304, storage network interface controller (NIC) 310, storage processing system 312, storage volumes 314, and network interface controller (NIC) emulation 320.

In typical operation, without NIC emulation 320, main processing system 302 may have a data request for storage volumes 314. Such a data request may include a request to store data in storage volumes 314, a request to read data in storage volumes 314, or any other request of storage volumes 314. Once main processing system 302 makes the request, the request is sent to main processing NIC 304 via a data bus. This data bus may include a PCI, PCIe, or any other data bus between main processing system 302 and main processing NIC 304. NIC 304 is then configured to convert the request to a NIC to NIC transmission format, such as Ethernet format, to communicate with storage NIC 310. Storage NIC 310 then passes the request, using a second data bus, to storage processing system 312 to fulfill the request from main processing system 302. In the case of a read request, storage processing system 312 may reverse the process described above and return data from storage volumes 314 to main processing system 302.

In contrast to providing the networked communication between main processing system 302 and storage processing system 312, NIC emulation 320 is provided to ensure faster communication between main processing system 302 and storage volumes 314. NIC emulation 320, which may reside in a storage subsystem, is used to mimic the communication between main processing NIC 304 and storage NIC 310, and further to process the data request from main processing system 302. By mimicking the NIC communication, NIC emulation 320 allows storage volumes 314 to be connected locally to processing system 302 using a data bus, although processing system 302 may regard the volumes as connected through a server or network attached storage element. Further, NIC emulation 320 allows for quicker responses to the data requests, as the requests no longer require a transition from a data bus to an alternative communication format.

Figure 4:
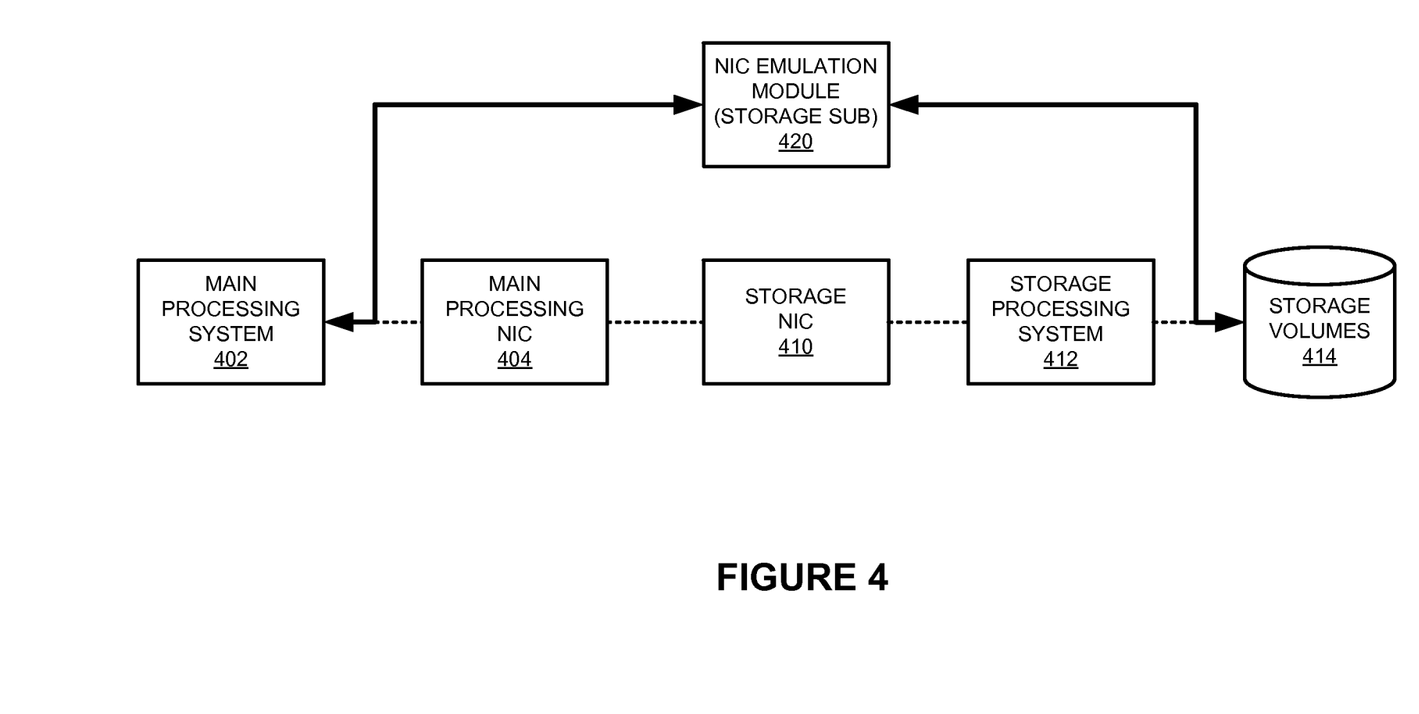
FIG. 4 illustrates an overview of network interface controller emulation.

FIG. 4 illustrates a NIC emulation overview according to another example. FIG. 4 includes main processing system 402, main processing NIC 404, storage NIC 410, storage processing system 412, storage volumes 414 and NIC emulation module 420. In the past, main processing system 402 and main processing NIC 404 may reside on one computing system, and storage NIC 410, storage processing system 412, and storage volumes 414 may reside on a separate computing system. Between these computing systems, communications and data requests would be communicated over a communication link, such as an Ethernet link, to read and write data to storage volumes 414.

In place of past communication methods that required a conversion from a data bus to a networked communication format, such as Ethernet, the present example provides mimicking the communication from main processing NIC 404 and storage NIC 410. A typical NIC to NIC communication will take a communication from the data bus of the first device, in this case main processing system 402, and convert that communication to one of a variety of communication formats for transmission to a second device. Upon receipt at the second NIC, in this case storage NIC 410, the communication must then be taken out of the communication format to be placed on the second data bus for processing.

The present example, however, allows communication between main processing system 402 and storage volumes 414 using a bus interface, such as PCIe, but allows storage volumes 414 to retain the appearance of being on a separate device. In operation, main processing system 402 may have a data request for storage volumes 414. Such a data request may include a data read request, a data write request, or any other request of storage volumes 414. Upon making the request, main processing system 402 will attempt to communicate with a NIC, such as main processing NIC 404, to pass the request to storage processing system 412. Here, instead of using a traditional NIC to communicate with the storage volumes, main processing system 402 is communicatively coupled with NIC emulation module 420, which is configured to appear as a NIC to processing system 402. NIC emulation module 420 is configured to emulate a network connection between a main processing system 402 and storage volumes 414, receive a data request for storage volumes 414 from main processing system 402, and provide main processing system 402 access to the storage volumes 414 as if the storage volumes were accessible over the network connection.

By including a NIC emulation module, such as NIC emulation module 420, main processing system 402 may delegate some of the storage responsibilities to another processor. This processor may be responsible for determining the appropriate location to store, read, copy, or any other storage related task. In some examples, the firmware or bios for processing system 402 may be previously configured to communicate with storage devices using a NIC. Thus, by implementing a NIC emulation module, there would be no reason to reconfigure the main processing system. Instead, the main processing system would identify storage volumes 414 as an external device allowing processing of the data storage to be accomplished using the emulation module.

Figure 5:
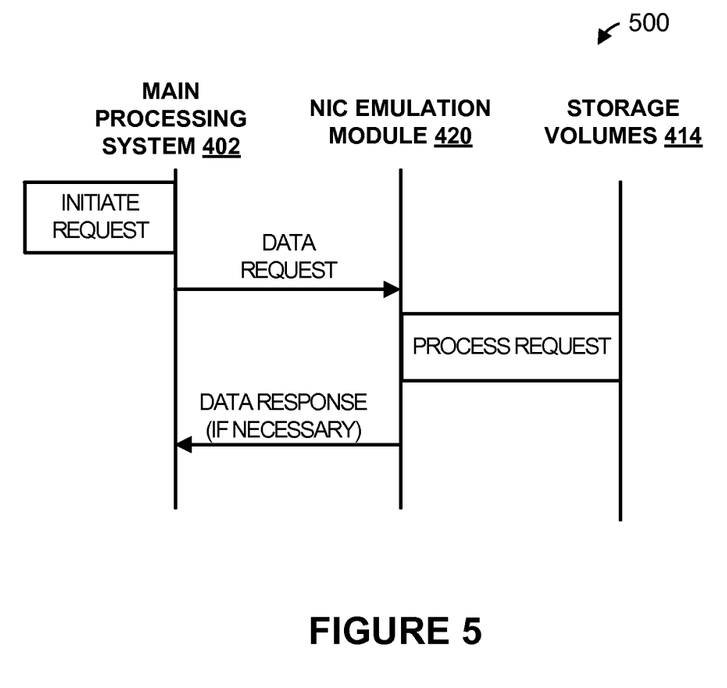
FIG. 5 illustrates a timing diagram for network interface controller emulation.

FIG. 5 illustrates a timing diagram 500 for a data request using NIC emulation module 420. In operation, main processing system 402 may initiate a data request based on the need for an application, a user, or any other suitable reason. A data request may include a data write request, a data read request, or any other request of data from storage volumes 414.

Upon making the request, NIC emulation module 420 is configured to identify the request and process the request accordingly. NIC emulation module 420 is further configured to mimic a NIC to NIC communication between main processing system 402 and an external storage device, such as a server or network attached storage. As a result, the storage volumes that are directly attached to NIC emulation module 420 may appear as though they are located in a networked device. In some examples, the request from main processing system 402 may be passed to NIC emulation module 420 along a data bus. This data bus maybe configured to use PCIe, PCI, or any other type of data bus.

In situations where the data request requires a return of data, NIC emulation module 420 may be configured to gather the appropriate data from storage volumes 414 and deliver the data to main processing system 402, using the appropriate data bus. By allowing an emulated NIC to NIC communication, main processing system 402 is able to delegate some of the storage responsibilities on an alternative processing system. Thus, main processing system 402 may have a greater amount of resources to accomplish processing intensive tasks.

Figure 6:
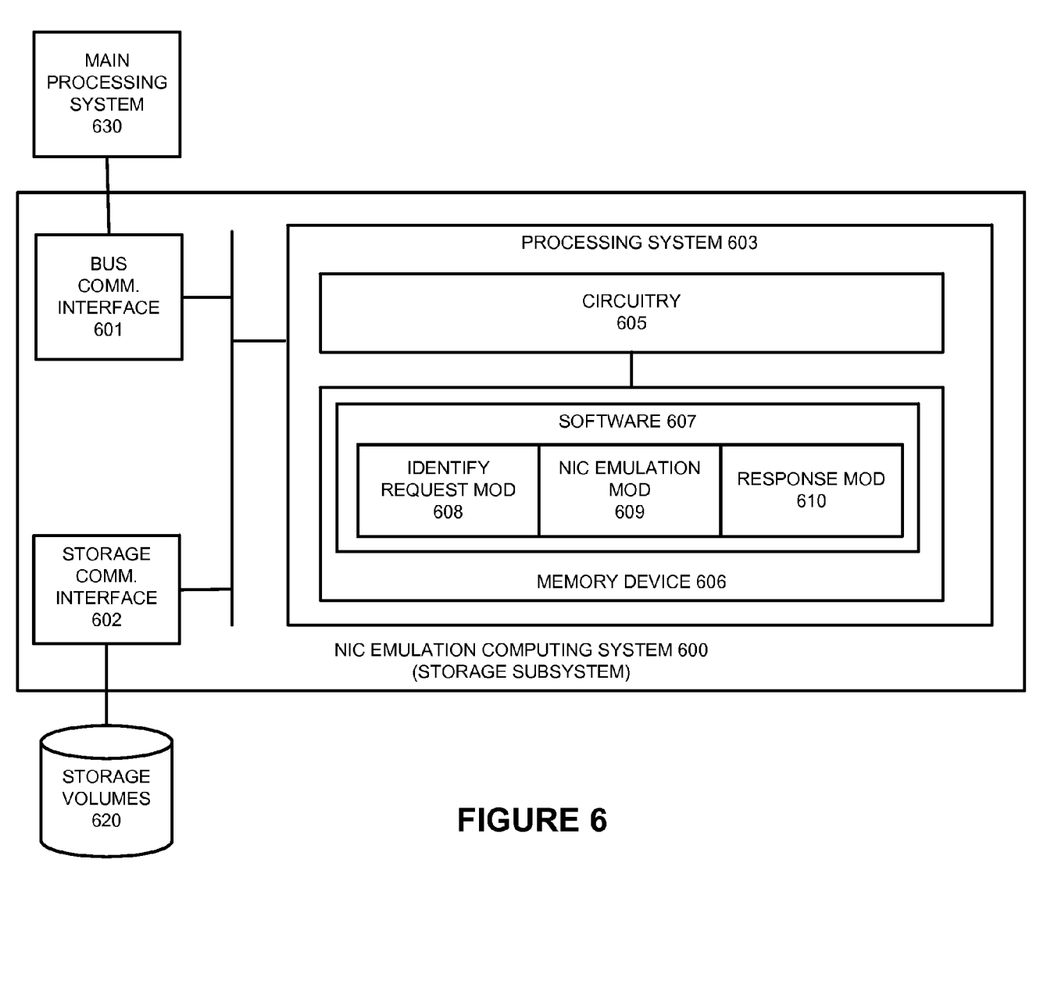
FIG. 6 illustrates a computing system for network interface controller emulation.

FIG. 6 illustrates a NIC emulation computing system 600, which may reside on a storage subsystem, according to one example. NIC emulation computing system 600 is an example of NIC emulator 104, although other NIC emulators may use alternative configurations. Emulation computing system 600 comprises bus communication interface 601, storage communication interface 602, and processing system 603. Processing system 603 is linked to communication interface 601 and storage communication interface 602. Processing system 603 includes processing circuitry 605 and memory device 606 that stores operating software 607.

Bus Communication interface 601 comprises components that communicate over bus communication links, such as ports, processing circuitry and software, or some other communication devices. Bus communication interface 601 may be configured to communicate over PCI, PCIe, or some other communication bus with main processing system 630. Main processing system 630 may be any processing system capable of making data requests to various storage volumes, such as a desktop computer processing system, a server computer processing system, or any other processing system for a similar computing device.

Processing circuitry 605 comprises microprocessor and other circuitry that retrieves and executes operating software 607 from memory device 606. Memory device 606 comprises a non-transitory computer readable storage medium, such as a disk drive, flash drive, data storage circuitry, or some other hardware memory apparatus. Memory device 606 may comprise a single device or could be distributed across multiple devices. Operating software 607 comprises computer programs, firmware, or some other form of machine-readable processing instructions. Operating software 607 includes identify request module 608, NIC emulation module 609, and response module 610. Operating software 607 may further include an operating system, utilities, drivers, network interfaces, applications, or some other type of software. When executed by circuitry 605, operating software 607 directs processing system 603 to operate NIC emulation computing system 600 as described herein.

In a particular example, main processing system 630 may require a data request from storage volumes 620. Such a data request may include a write request, a read request, or any other similar type of data request. Typically, main processing system 630 may connect to storage volumes using Serial Advanced Technology Attachment (SATA), Serial Attached SCSI (SAS), Host Bus Adapters (HBAs) or some other similar connection. Additionally, main processing system 630 may connect to network attached drives over a NIC to NIC communication that allows the storage to be processed using a server or a network-attached storage device.

In contrast to the previous methods, NIC emulation computing system 600 is configured to mimic the NIC to NIC communication that would typically occur between main processing system 630 and a network storage device. As a result, the storage volumes may appear as though they are on a server or other network-attached storage device, but are physically connected to main processing system 630 using bus communication interface 601. Here, NIC emulation computing system 600 is configured to identify the request of main processing system 630 using identify request software module 608 and bus communication interface 601. Further, NIC emulation software module 609 is configured to mimic the connection between two network interface controllers, and response module 610 is configured to provide main processing system 630 with access to storage volumes 620. Storage volumes 620 comprise non-transitory computer readable storage mediums, such as disk drives, flash drives, data storage circuitry, or some other hardware memory apparatus.

Although illustrated with three software modules in the present example, it should be understood that NIC emulation computing system 600 may be implemented using one or more software modules. Furthermore, although computing system 600 is illustrated as a single device for simplicity, it should be understood that NIC emulation computing system 600 may be implemented on one or more computing devices.

Figure 7:
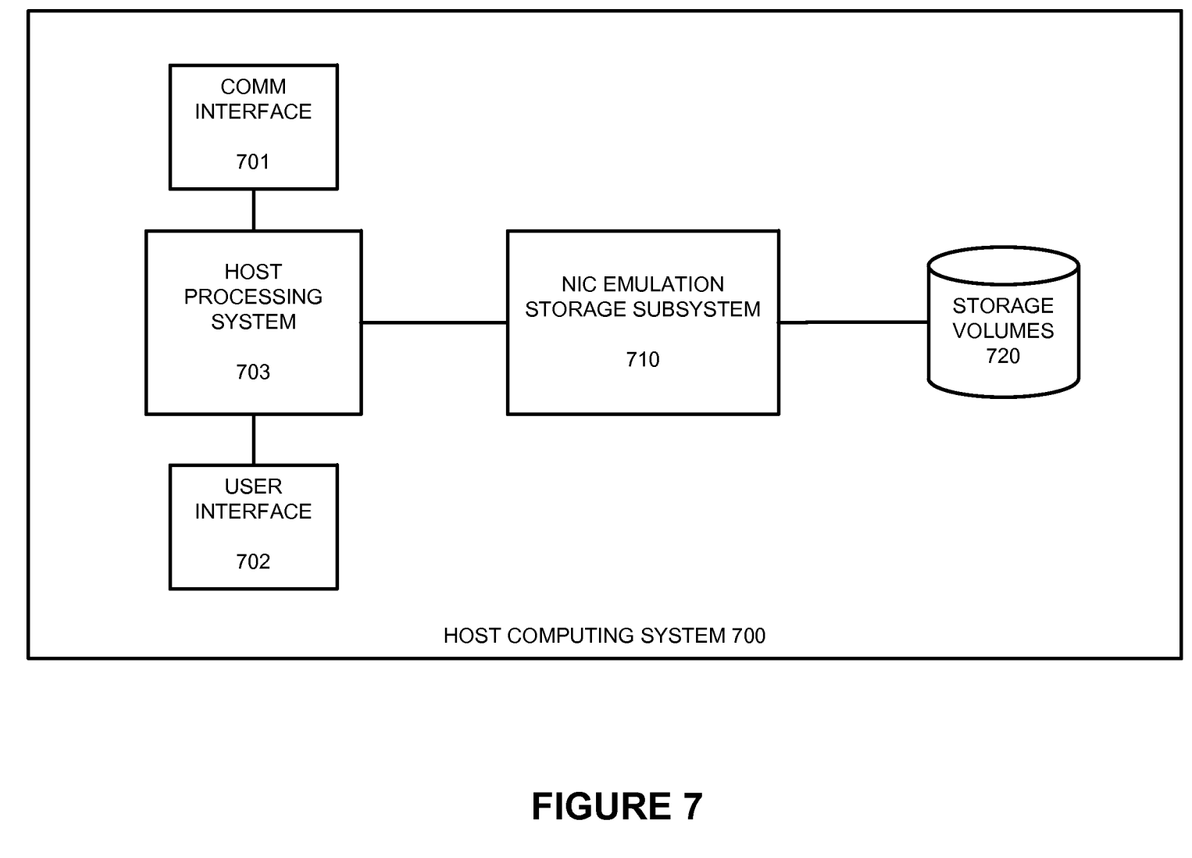
FIG. 7 illustrates a host computing system with NIC emulation functionality.

FIG. 7 illustrates a host computing system 700 according to one example. Host computing system 700 may represent a desktop computer, a server computer, a laptop computer, or some other similar computing device. Host computing system 700 includes communication interface 701, user interface 702, host processing system 703, NIC emulation storage subsystem 710, and storage volumes 720. Host processing system 703 is an example of main processing system 102 or main processing system 630, although other configurations may exist. NIC emulation storage subsystem 710 may include an emulated NIC, such as NIC emulator 104 and NIC emulation computing system 600, although other examples are possible. Host processing system 703 is communicatively coupled to communication interface 701, user interface 702, and NIC emulation storage subsystem 710. NIC emulation storage subsystem 710 is further communicatively coupled to storage volumes 720, although it should be understood that NIC emulation storage subsystem 710 may be implemented on storage volumes 720.

Communication interface 701 comprises components that communicate over communication links, such as network cards, ports, RF transceivers, processing circuitry and software, or some other communication devices. Communication interface 701 may be configured to communicate over metallic, wireless, or optical links. Communication interface 701 may be configured to use TDM, IP, Ethernet, optical networking, wireless protocols, communication signaling, or some other communication format—including combinations thereof.

User interface 702 comprises components that interact with a user. User interface 702 may include a keyboard, display screen, mouse, touch pad, or some other user input/output apparatus. User interface 702 may be omitted in some examples.

In operation host processing system 703, which comprises microprocessor circuitry, may have a data request for storage volumes 720. Such a request may include a data read request, a data write request, or any other similar type of request. A data bus, such as a PCI or PCIe bus, will then transfer this request to NIC emulation storage subsystem 710. NIC emulation storage subsystem 710 is configured to appear as a NIC to host processing system 703, allowing storage volumes 720 to appear as though they are located on an external serving device. Upon receipt of the request, NIC emulation storage subsystem 710 is then configured to process and respond to the desired task from host processing system 703. In some examples, the response to the data request may include storing the data in the appropriate location, reading the data from the appropriate location, or any other response to accomplish the desired task of host processing system 703.

By emulating a NIC to NIC communication, NIC emulation storage subsystem 710 is able to offload some of the data storage processing from host processing system 703 despite being located locally on host computing system 700. Additionally, although NIC emulation storage subsystem 710 is illustrated locally on host computing system 700, it should be understood that subsystem 710 may be connected externally by a data bus from host processing system 703.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a storage subsystem coupled with a host, the method comprising:
   emulating, to a main processing system on the host, a network connection through an emulated network interface controller (NIC) to a storage volume;
   receiving, over a bus between the main processing system and the storage subsystem, a data request originated by the main processing system and directed to the emulated NIC that requests access to the storage volume; and providing the main processing system with the access to the storage volume via the emulated NIC as if the storage volume were accessible over the network connection.

2. The method of claim 1 wherein the bus comprises a Peripheral Component Interconnect Express bus.

3. The method of claim 1 wherein the storage volume appears as a network attached storage device to the main processing system.

4. The method of claim 1 wherein the storage volume appears as a serving device to the main processing system.

5. The method of claim 1 wherein the data request comprises a read request.

6. The method of claim 1 wherein the data request comprises a write request.

7. The method of claim 1 wherein the emulated NIC appears as a non-emulated NIC to the main processing system.

8. One or more non-transitory computer readable media having processing instructions stored thereon that, when executed by a storage subsystem, direct the storage subsystem to:

emulate, to a main processing system on a host, a network connection through an emulated network interface controller (NIC) to a storage volume;

receive, over a bus between the main processing system and the storage subsystem, a data request originated by the main processing system and directed to the emulated NIC that requests access to the storage volume; and provide the main processing system with the access to the storage volume via the emulated NIC as if the storage volume were accessible over the network connection.

9. The one or more non-transitory computer readable media of claim 8 wherein the bus comprises a Peripheral Component Interconnect Express bus.

10. The one or more non-transitory computer readable media of claim 8 wherein the data request comprises a data read request.

11. The one or more non-transitory computer readable media of claim 8 wherein the data request comprises a data write request.

12. The one or more non-transitory computer readable media of claim 8 wherein the storage volume appears as a network attached storage element to the main processing system.

13. The one or more non-transitory computer readable media of claim 8 wherein the storage volume appears as a serving device to the main processing system.

14. The one or more non-transitory computer readable media of claim 8 wherein the emulated NIC appears as a non-emulated NIC to the main processing system.

15. A system comprising:
a storage volume; and
an emulated network interface controller (NIC) coupled to a host configured to:
emulate, to a main processing system on the host, a network connection between the main processing system and the storage volume;
receive, over a bus between the main processing system and the emulated NIC, a data request originated by the main processing system and directed to the emulated NIC that requests access to the storage volume; and
provide the main processing system with the access to the storage volume as if the storage volume were accessible over the network connection.

16. The system of claim 15 wherein the data request comprises a read request.

17. The system of claim 15 wherein the data request comprises a write request.

18. The system of claim 15 wherein the emulated NIC is further configured to appear as a non-emulated NIC to the main processing system.

19. The system of claim 15 wherein the storage volume appears as a serving device to the main processing system.

20. The system of claim 15 wherein emulating, to the main processing system on the host, the network connection between the main processing system and the storage volume comprises representing the storage volume as a network attached storage volume to the main processing system.

* * * * *